United States Patent
Wang

(10) Patent No.: US 6,473,527 B1
(45) Date of Patent: Oct. 29, 2002

(54) MODULE AND METHOD FOR INTERFACING ANALOG/DIGITAL CONVERTING MEANS AND JPEG COMPRESSION MEANS

(75) Inventor: Chia-Ying Wang, Taichung Hsien (TW)

(73) Assignee: Mustek Systems Inc., Hsinchu (TW)

( * ) Notice: Subject to any disclaimer, the term of this patent is extended or adjusted under 35 U.S.C. 154(b) by 0 days.

(21) Appl. No.: 09/324,095

(22) Filed: Jun. 1, 1999

(51) Int. Cl.⁷ ................................................. G06K 9/36
(52) U.S. Cl. ....................................... 382/232; 382/248
(58) Field of Search ................................ 382/232, 248; 348/231; 341/126, 144; 358/426, 432, 433

(56) References Cited

U.S. PATENT DOCUMENTS

| | | | |
|---|---|---|---|
| 5,761,180 A | * | 6/1998 | Murabayashi et al. ...... 369/124 |
| 6,111,605 A | * | 8/2000 | Suzuki ........................ 348/220 |
| 6,134,375 A | * | 10/2000 | Naganawa et al. ............ 386/33 |
| 6,323,897 B1 | * | 11/2001 | Kogane et al. .............. 348/159 |
| 6,323,899 B1 | * | 11/2001 | Roberts et al. .............. 348/220 |
| 6,330,028 B1 | * | 12/2001 | Oie et al. .................... 348/231 |

* cited by examiner

*Primary Examiner*—Yon J. Couso
(74) *Attorney, Agent, or Firm*—Christensen O'Connor Johnson Kindness PLLC

(57) ABSTRACT

An interface module and method is disclosed for receiving the digital image data output of an analog/digital converter and transmitting the digital image data output to the JPEG compression device when the image data is determined to be compressed. The interface module comprises a read control device, an output control device and a memory device. The read control device reads a predetermined number of image lines from the data output of the analog/digital converter and stores these image data in a memory device. The memory device can save the same number of image lines as the memory device built in the JPEG compression device. After reading the predetermined number of image lines, the read control device will generate a control signal to the output control device for sequentially reading an image block from the memory device and sending each of the image block to the JPEG compression device. Since the image block is of the same size of the compression unit required by the JPEG compression device, therefore the image block can be directly transmitted to the JPEG compression device for data compression without having to access an extra memory device.

11 Claims, 3 Drawing Sheets

MODULE AND METHOD FOR INTERFACING ANALOG/DIGITAL CONVERTING MEANS AND JPEG COMPRESSION MEANS

BACKGROUND OF THE INVENTION

A. Field of the Invention

The invention is generally related to a module and method for interfacing analog/digital converting means and JPEG compression means, and especially to a module and method which complies with JPEG compression format without having to use an extra memory device originally required by JPEG compression means.

B. Description of the Prior Art

JPEG (Joint Photographic Experts Group) graphic images refer to images compressed following the set of compression algorithms defined by the International Standard Organization for still image compression standard. Since the JPEG algorithm (ITU-T Rec.T.81/ISO/IEC 10918-1) does not permit the modification of the coding parameters in the middle of the encoding of a single image. Hence, any JPEG compliant rate control scheme has to process an input image at least twice. One pass is to assess the complexity of the image and the other to perform the actual coding.

Currently JPEG algorithms are implemented as Integrated Circuits by hardware vendors for still image compression in the application for a scanner, or even a host computer to increase the speed of image compression and decompression. FIG. 1 illustrates a functional block diagram for a conventional JPEG compression device. Refer to FIG. 1, the JPEG compression means 1 2, which is an integrated circuit, can receive the digital image data output from a memory device 15. The memory device 15 can be a random access memory or any memory device. The memory device 15 receives the data output from an analog/digital converter 11.

Since JPEG compliant rate control scheme has to process an input image at least twice, and the data rates of compression and transmission are different, so the JPEG compression device 12 has a built-in memory device 13 and an extra memory device 14, usually a RAM, for temporary storing the image data while compressing. Take a general JPEG compression algorithm as an example, the basic compression unit is an image block of 8×8 pixels. Accordingly, the size of the memory device 13 can store 8×8 pixels at one time. On the other hand, the image data in the memory device 15 is transmitted to the memory device 14 line by line in a sequential order. As soon as the memory device 14 is full, the image data will be transmitted to the memory device 13 as an image block each time for image compression. The disadvantage for this approach is that an extra memory 14 is required to comply with the compression unit of the memory device 13. For the concern of cost and efficiency, it is desirable that the extra memory 14 is to be omitted.

SUMMARY OF THE INVENTION

Accordingly, it is an object of the present invention to provide a module and method for interfacing an analog/digital converter and a JPEG compression means which involves in a memory management so as to save an extra memory device originally required by JPEG compression means.

In accordance with the invention, the invention applies an interface module for receiving the digital image data output of an analog/digital converter and transmitting the digital image data output to the JPEG compression device when the image data output is determined to be compressed. The interface module comprises a read control device, an output control device and a memory device. The read control device reads a predetermined number of image lines from the data output of the analog/digital converter and stores these image data in a memory device. The memory device can save the same number of the image lines as the memory device built-in the JPEG compression device. If the compression unit is an 8×8 image block, then the memory device can store 8 lines of image data. After reading the predetermined number of lines of image data, the read control device will generate a control signal to the output control device for reading an image block from the memory device in a sequential order and sequentially send each of the image block to the JPEG compression device. Since the image block is of the same size of the compression unit required by the JPEG compression device, therefore the image block can be directly transmitted to the JPEG compression device for data compression without having to access the extra memory device. Consequently, the cost on the extra memory can be saved.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1:
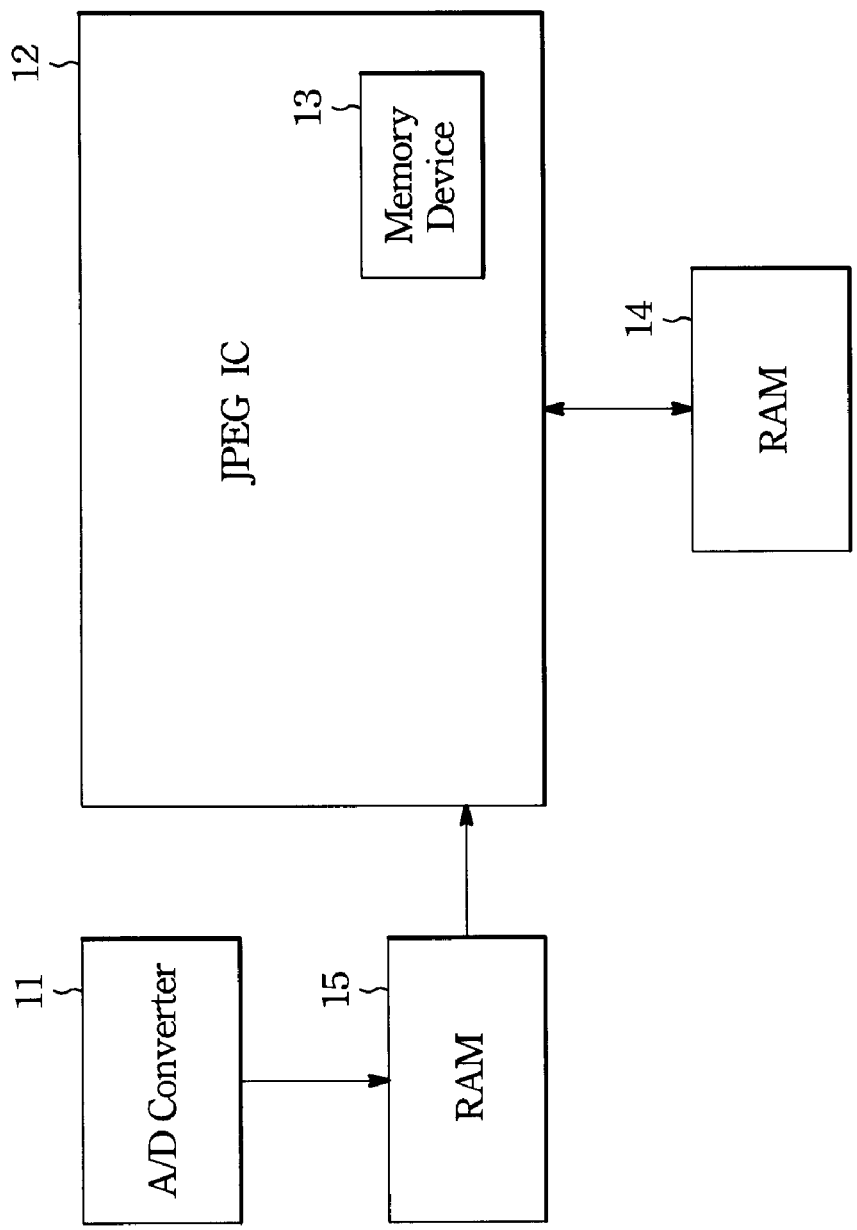
FIG. 1 is a functional block diagram schematically showing the structure of a conventional JPEG compression device.
Figure 2:
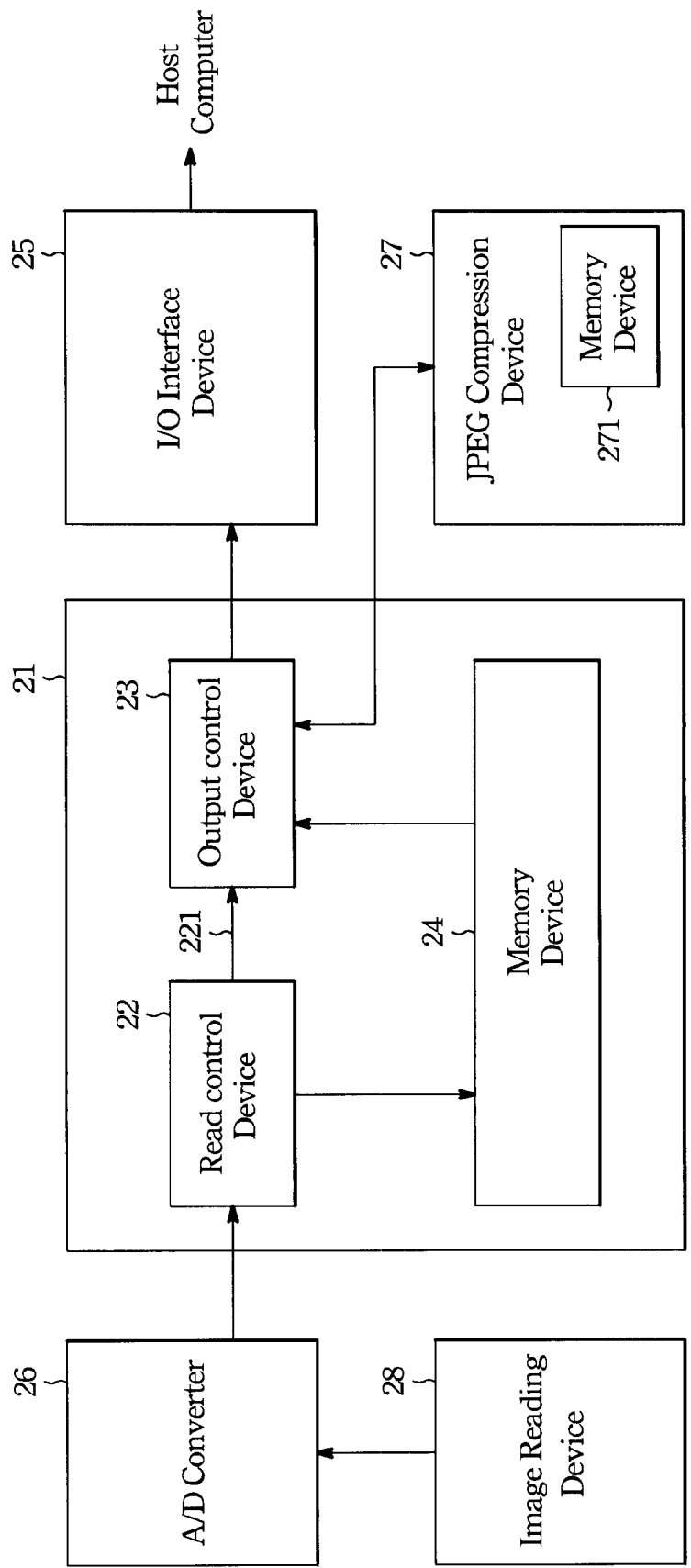
FIG. 2 is a functional block diagram showing the structure of the interfacing module according to the preferred embodiment of the present invention.

Refer to FIG. 2 for showing the interface module 21 of the present invention. It comprises a read control device 22, an output control device 23, and a memory device 24. The interface module 21 is a modularized unit for communicating the analog/digital converter 26 and the JPEG compression device 27. The interface module 21 can be adapted to a JPEG compression device 27 in a still image processor, such as a scanner, or even a digital camera, for image compression. The interface module 21 receives the image data output of the analog/digital converter 26 and sends the image data to the JPEG compression device 27 when the image data is determined to be compressed. If the image data does not need to be compressed, the interface module 21 can transfer the image data to an input/output interface 25 for sending the image data to a host computer for further image processing.

On the other hand, the analog/digital converter 26 receives the image data output from the image reading device 28. The image reading device 28 can be a charge coupled device, a contact image sensor, or a digital camera.

In the interface module 21, read control device 22 reads a predetermined number of image lines from the image data output of the analog/digital converter 26 and store the image data in the memory device 24. The memory device 24 can store the same number of image lines as that of the memory device 271 built in the JPEG compression device 27. For instance, if the compression unit is 8×8 pixels, the memory device 24 can save 8 lines of image data. After finishing reading the 8 lines of image data, the read control device 22 generates a control signal 221 to the output control device 23 for sequentially reading the image block of 8×8 pixels from the memory device 24 and store the image block in the memory device 271. Since the image block complies with size required by the compression unit of the JPEG compression device, so the image block can be directly sent to the JPEG compression device 27 for compression without having to access an extra memory. Consequently, the cost on the memory device can be saved.

Figure 3:
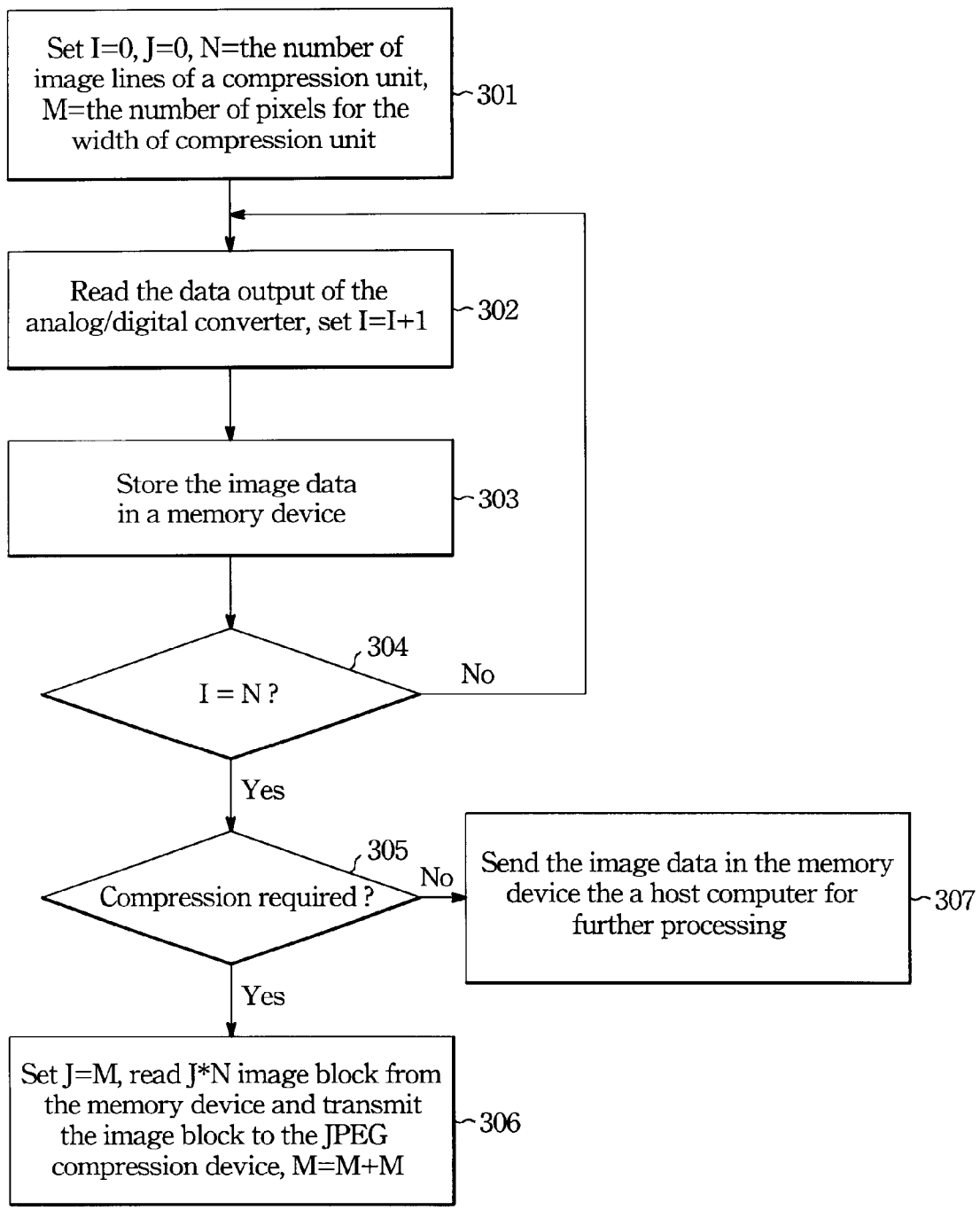
FIG. 3 is a flowchart showing the inventive method according to the preferred embodiment of the present invention.

The flowchart of the operations of the inventive interface module is illustrated in FIG. 3.

301: Set I=0, J=0, N=the number of image lines of a compression unit, M=the number of pixels for the width of a compression unit;

302: Read the data output of the analog/digital converter, set I=I+1;

303: Store the image data in a memory device in a sequential order;

304: Determine if I=N? If yes, go to step 305, if not, go to step 302;

305: Determine if the image data is to be compressed? If yes, go to step 306, if not, go to step 307;

306: Set J=M, read J*N image block from the memory device and transmit the image block to the JPEG compression device, M=M+M;

307: Send the image data in the memory device to a host computer for further processing.

To sum up, the inventive module and method which complies with JPEG compression format is capable of communicating the image data output of an analog/digital converter and a JPEG compression device in a still image processor. Moreover, the interface module of the present invention functions as a memory device against the different data rates of compression and transmission. Consequently, with the inventive interface module, a JPEG compression device doesn't need an extra memory for data swapping.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A module for interfacing analog/digital converting means and JPEG compression means, said JPEG compression means having a built-in memory device, comprising:
   read control means coupled to said analog/digital converting means for sequentially reading a predetermined number of image lines from a data output of said analog/digital converting means, and generating a control signal after finishing reading said predetermined number of image lines;
   memory means coupled to said read control means for storing said predetermined number of image lines, said memory means capable of storing the same number of image lines as said built-in memory device; and
   output control means in response to said control signal for sequentially reading an image block from said memory means and forwarding said image block to said built-in memory device.

2. The module as claimed in claim 1, wherein said analog/digital converting means is coupled to a charge coupled device for converting the data output of said charge coupled device to digital data.

3. The module as claimed in claim 1, wherein said analog/digital converting means is coupled to a contact image sensor for converting the data output of said contact image sensor to digital data.

4. The module as claimed in claim 1, wherein said analog/digital converting means is coupled to a digital camera for converting data output of said digital camera into digital data.

5. The module as claimed in claim 1, wherein said memory means is a random access memory.

6. The module as claimed in claim 1, wherein said predetermined number of image lines is eight, and said image block is 8×8 pixels.

7. The module as claimed in claim 1, further comprising:
   input/output interfacing means coupled to an input/output port of a host computer for sending data output from said interface module to said host computer.

8. A method for interfacing analog/digital converting means and JPEG compression means, said JPEG compression means having a built-in memory device, comprising the steps of:
   sequentially reading a predetermined number of image lines from the image data output of said analog/digital converting means;
   storing said predetermined number of image lines in memory means, said memory means capable of storing the same number of image lines as said built-in memory device; and
   sequentially reading a predetermined size of image block from said memory means to said built-in memory device when said image data output is determined to be compressed.

9. The method as claimed in claim 8, further comprising the step of:
   forwarding said predetermined size of image block to an input/output interfacing means so as to send said predetermined size of image block to a host computer, when said image data output of said analog/digital converting means is determined not to be compressed.

10. The method as claimed in claim 8, wherein said predetermined number of image lines is eight, and said predetermined size of image block is 8×8 pixels.

11. The method as claimed in claim 8, wherein the size of said memory means is determined by the compression format of said JPEG compression means.

* * * * *